Jan. 10, 1939. F. G. HITCHCOCK 2,143,440
CLIP
Filed Feb. 1, 1937
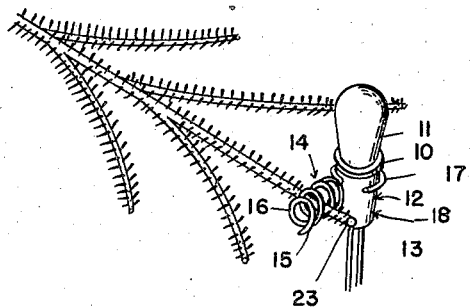
FIG.1.
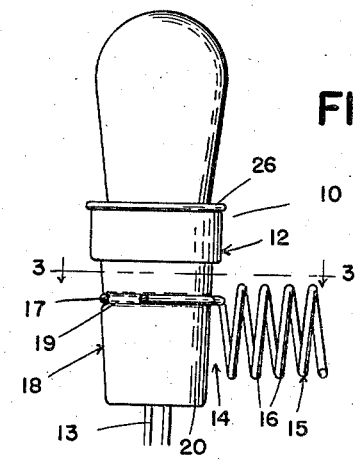
FIG.2.
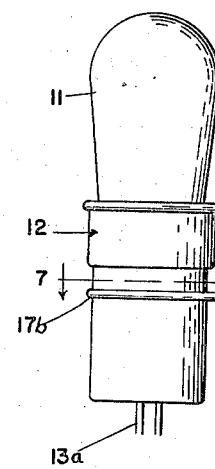
FIG.8.
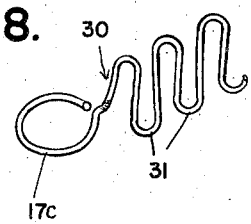
FIG.3.
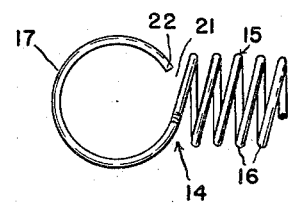
FIG.4.
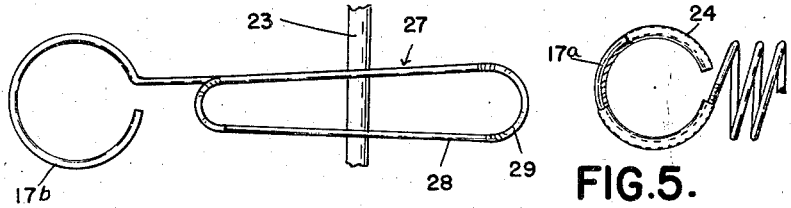
FIG.6.
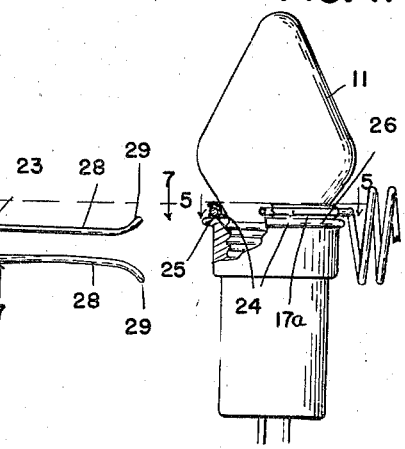
FIG.7.
FIG.5.
INVENTOR
FLOYD G. HITCHCOCK
BY
Whittemore Hulbert Belknap
ATTORNEYS Patented Jan. 10, 1939

2,143,440

UNITED STATES PATENT OFFICE 2,143,440

CLIP

Floyd G. Hitchcock, Detroit, Mich.

Application February 1, 1937, Serial No. 123,525

2 Claims. (Cl. 24—81)

The present invention relates to improvements in clips and more particularly to clips for ornamental lighting units such as Christmas tree lighting sets and the like.

The clipping means commonly used at the present time to attach each individual lighting unit of the sets to Christmas trees have definite defects. One of the most important defects is that the production cost is so great as to prohibit the use of the clips on these inexpensive Christmas tree lighting sets. Serious functional defects in the existing clips are that the attaching means will neither hold the unit in place upon the tree nor allow numerous attaching angles. Also considerable difficulty is experienced in maintaining the clip upon the base of the unit.

The object of the present invention is to provide an extremely simple and inexpensive clip which will allow firm attachment of the small units to the tree branches at practically any angle desired. A further object of applicant's invention is to provide a clip which can be firmly attached to the unit itself. Other objects of the invention will be more apparent as this description proceeds, especially when considered in connection with the accompanying drawing, wherein Figure 1 is a view of the clip in place upon a unit and attached to the tree;

Figure 2 is an enlarged view of the unit with the clip attached to the socket portion;

Figure 3 is a top plan view taken on line 3—3 of Figure 2, with the socket omitted;

Figure 4 is a modification of the embodiment shown in Figure 2 with a portion thereof broken away to show a different method of attachment;

Figure 5 is a top plan view taken on line 5—5 of Figure 4, with the socket omitted;

Figure 6 is also a modification of the embodiment shown in Figure 2 and attached to a portion of the tree;

Figure 7 is a top plan view taken on line 7—7 of Figure 6 with the socket omitted;

Figure 8 is a further modification of the embodiment shown in Figure 2.

Referring to the drawing more in detail, 10 indicates the unit consisting of a bulb 11 seated in a socket 12. Attached to the socket 12 are wires 13 connecting the unit to others in the set as well as to the electrical supply. The clip 14 consists in its preferred form of a spiral spring 15 having several convolutions 16. Integrally attached to the spring 15 is clasping means 17 herein shown in the form of a loop having a snap-on engagement with the sides 18 of the socket 12 and fitting in the groove 19 in the side of the socket. When in position the axis of the convolutions 16 are at substantially right angles to the axis of the socket 12 and the attaching means 17.

Since the socket 12 is normally made of very inexpensive molded plastic, side portions 18 are frequently tapered inwardly towards the bottom 20 to facilitate easy removal from the molds and thus the groove 19 has been shown in a side portion 18 of the socket to allow the clasping means 17 to more firmly grip the socket 12. This is not necessary, however, in either of the tapered or straight-sided sockets.

While the clip 14 may be made of numerous materials, it is preferable to use spring metal wire 15 because the latter is extremely inexpensive, yet possesses a great amount of resiliency. In the preferred form the wire is wound in a rather tight spiral, one end of which is bent up to form the looped clasping means 17, so that its axis is at approximately right angles to the axis of the remaining convolutions. This loop should be substantially a circle of approximately equal circumferential area to that of the lamp socket. By so designing the clasping means, benefit of the resiliency of the spring metal is received upon all sides 18 of the socket 12. By leaving a small opening 21 between the spring 15 and the end 22 of the clasping means 17, the latter may be easily slipped over wires 13 and snapped into place in the groove 19. A portion of the tree 23 over which the clip is to be slipped is forced between any of the convolutions 16 at any angle in which the unit 10 is desired to be placed. The resiliency of the spring metal convolutions 16 will maintain the unit firmly in place without injury to the tree.

The modification shown in Figures 4 and 5 is the same construction as that shown in Figures 2 and 3, the difference being in the method of attaching the clip to the unit. In this construction a washer 24 having a slight groove 25 in the outer periphery thereof, is slipped onto the inside of the attaching means 17a. The clip is then placed upon the top portion 26 of the socket 12 and the bulb 11 is then screwed in place, firmly holding the clip to the unit. When this method of attachment is used, care should be taken in using a washer that will properly insulate the clasping means 17a from all of the current carrying portions of the unit 10.

The modifications shown in Figures 6 and 7 disclose an elongated oval spring 27, the spirals 28 of which are preferably closer together than those shown in the preferred form. To allow for easy insertion of the branch portion 23 of the tree, the rounded outer return bent portions 29 of the spring 27 are preferably bent away from one another, although this is not necessary. The clasping means 17b is the same as that shown in the preferred form in Figure 2, but is shown as being in the same plane as the spring 27 instead of at right angles thereto. This clasp is also subject to the same variations of material, but spring metal wire is the preferred form.

Modifications shown in Figure 8 consists of a spring wire 30 having a clasping portion 17c and a series of juxtapositioned loops 31 arranged in a common plane. The clasping means 17c is the same as means 17 of the preferred form, and is shown as being at right angles to the loop 31.

Having thus described my invention, it will be evident that numerous uses and variations of the clip would be possible while still remaining within the spirit and scope of the invention.

What I claim as my invention is:

1. A resilient clip for an ornamental light socket comprising a single piece of wire forming a single open ended convolution in one plane and a plurality of spiral convolutions at one side and immediately adjacent said open ended convolution, the axis of said spiral convolution being at substantially right angles to the axis of the open ended convolution.

2. A resilient clip for an ornamental light socket comprising a single piece of wire forming a single open ended convolution in one plane and a plurality of spiral convolutions at one side and immediately adjacent said open ended convolution, the axis of said spiral convolution being at substantially right angles to the axis of the open ended convolution and an insulating cover for said single convolution.

FLOYD G. HITCHCOCK.